US009256316B2

(12) United States Patent
Thomas et al.

(10) Patent No.: US 9,256,316 B2
(45) Date of Patent: Feb. 9, 2016

(54) POWER GATING A DISPLAY OF A DATA PROCESSING DEVICE DURING CLONING THEREOF ACROSS AN EXTERNAL DISPLAY WHILE RETAINING TOUCH-SENSIBILITY THEREOF

(71) Applicant: NVIDIA Corporation, Santa Clara, CA (US)

(72) Inventors: Jithin Thomas, Maharashtra (IN); Darshan Uppinkere, Maharashtra (IN); Neilesh Chorakhalikar, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 90 days.

(21) Appl. No.: 13/887,283

(22) Filed: May 4, 2013

(65) Prior Publication Data
US 2014/0327625 A1 Nov. 6, 2014

(51) Int. Cl.
*H04W 52/02* (2009.01)
*G06F 3/041* (2006.01)
*G09G 3/34* (2006.01)

(52) U.S. Cl.
CPC ............ *G06F 3/0416* (2013.01); *G09G 3/3406* (2013.01); *H04W 52/02* (2013.01); *H04W 52/027* (2013.01); *H04W 52/0261* (2013.01); *G09G 2330/022* (2013.01)

(58) Field of Classification Search
CPC ............ H04W 52/02; H04W 52/0261; H04W 52/027
USPC ............................. 345/1.1, 102, 173, 501, 506
See application file for complete search history.

(56) References Cited

U.S. PATENT DOCUMENTS

| 7,830,401 | B2* | 11/2010 | Sonobe | 345/699 |
| 8,238,979 | B2* | 8/2012 | Rajamani et al. | 455/566 |
| 8,358,273 | B2 | 1/2013 | Hodge et al. | |
| 8,631,490 | B2* | 1/2014 | Wurster | 726/22 |
| 2003/0025678 | A1 | 2/2003 | Lee et al. | |

(Continued)

FOREIGN PATENT DOCUMENTS

| EP | 0802519 A1 | 10/1997 |
| EP | 1990707 A1 | 11/2008 |

OTHER PUBLICATIONS

Examination Report from German Patent Application No. 10 2013 109 406.6, dated Jan. 8, 2014.

Primary Examiner — Joni Richer
(74) Attorney, Agent, or Firm — Zilka-Kotab, PC

(57) ABSTRACT

A method includes detecting, through a processor communicatively coupled to a memory, coupling of an external display to a data processing device including an internal display, and cloning, through the processor, display data of the internal display on the external display following the detection of the coupling. The method also includes triggering, through a driver component, the processor to turn off a backlight of the internal display of the data processing device, power gate circuitry associated with rendering the display data on the internal display and/or power gate a processing pipeline associated with the rendering of the display data following the cloning. Further, the method includes maintaining, through the driver component, a touchscreen capability of the internal display even when the backlight is turned off, the circuitry associated with the rendering of the display data is power gated and/or the processing pipeline associated therewith is power gated.

14 Claims, 4 Drawing Sheets

(56) References Cited

U.S. PATENT DOCUMENTS

| | | |
|---|---|---|
| 2009/0160883 A1 | 6/2009 | Sonobe |
| 2010/0225640 A1* | 9/2010 | Vieri et al. .................. 345/214 |
| 2010/0275163 A1* | 10/2010 | Gillespie et al. ............ 715/810 |
| 2010/0293402 A1 | 11/2010 | Marinkovic et al. |
| 2011/0032367 A1 | 2/2011 | Ugawa et al. |
| 2012/0185712 A1 | 7/2012 | de Cesare et al. |
| 2012/0256489 A1 | 10/2012 | Beckers et al. |
| 2014/0035816 A1 | 2/2014 | Liao et al. |
| 2014/0111449 A1* | 4/2014 | Lee .............................. 345/173 |
| 2014/0139431 A1 | 5/2014 | Tseng et al. |

* cited by examiner

POWER GATING A DISPLAY OF A DATA PROCESSING DEVICE DURING CLONING THEREOF ACROSS AN EXTERNAL DISPLAY WHILE RETAINING TOUCH-SENSIBILITY THEREOF

FIELD OF TECHNOLOGY

This disclosure relates generally to data processing devices and, more particularly, to a method, a device and/or a system of power gating a display of a data processing device during cloning thereof across an external display while retaining touch-sensibility thereof.

BACKGROUND

A display of a data processing device (e.g., a mobile phone, a tablet) may be limited by a size/display attribute capability thereof to display data (e.g., image, video) to a user. The user may, therefore, desire to utilize an enhanced capability of an external display through coupling thereof to the data processing device. Utilization of both the displays may consume a lot of power even though only one display, viz. the external display, is effectively utilized by the user. The user may opt to switch off the display of the data processing device. Then, the user may communicatively couple an input device such as a keyboard/keypad to the data processing device to interact therewith by way of the external display. The aforementioned requirement of coupling of the input device may be an inconvenience to the user.

SUMMARY

Disclosed are a method, a device and/or a system of power gating a display of a data processing device during cloning thereof across an external display while retaining touch-sensibility thereof.

In one aspect, a method detecting, through a processor communicatively coupled to a memory, coupling of an external display to a data processing device including an internal display, and cloning, through the processor, display data of the internal display on the external display following the detection of the coupling. The method also includes triggering, through a driver component, the processor to: turn off a backlight of the internal display of the data processing device, power gate circuitry associated with rendering of the display data on the internal display and/or power gate a processing pipeline associated with the rendering of the display data on the internal display following the cloning.

Further, the method includes maintaining, through the driver component, a touchscreen capability of the internal display even when the backlight thereof is turned off, the circuitry associated with the rendering of the display data on the internal display is power gated and/or the processing pipeline associated with the rendering of the display data on the internal display is power gated.

In another aspect, a data processing device includes a memory, a processor communicatively coupled to the memory, and an internal display interfaced with the processor. The processor is configured to execute instructions to detect coupling of an external display to the data processing device, and clone display data of the internal display on the external display following the detection of the coupling. The data processing device also includes a driver component configured to enable triggering the processor to: turn off a backlight of the internal display of the data processing device, power gate circuitry associated with rendering of the display data on the internal display and/or power gate a processing pipeline associated with the rendering of the display data on the internal display following the cloning.

Also, the driver component is configured to enable maintaining a touchscreen capability of the internal display even when the backlight thereof is turned off, the circuitry associated with the rendering of the display data on the internal display is power gated and the processing pipeline associated with the rendering of the display data on the internal display is power gated.

In yet another aspect, a non-transitory medium, readable through a data processing device and including instructions embodied therein that are executable through the data processing device, is disclosed. The non-transitory medium includes instructions to detect, through a processor communicatively coupled to a memory, coupling of an external display to the data processing device including an internal display, and instructions to clone, through the processor, display data of the internal display on the external display following the detection of the coupling. The non-transitory medium also includes instructions to trigger, through a driver component, the processor to: turn off a backlight of the internal display of the data processing device following the cloning, power gate circuitry associated with rendering of the display data on the internal display and/or power gate a processing pipeline associated with the rendering of the display data on the internal display.

Further, the non-transitory medium includes instructions to maintain, through the driver component, a touchscreen capability of the internal display even when the backlight thereof is turned off, the circuitry associated with the rendering of the display data on the internal display is power gated and the processing pipeline associated with the rendering of the display data on the internal display is power gated.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or a device of power gating a display of a data processing device during cloning thereof across an external display while retaining touch-sensibility thereof. Although the present embodiments have been described with reference to specific example embodiments, it will be evident that various modifications and changes may be made to these embodiments without departing from the broader spirit and scope of the various embodiments.

Figure 1:
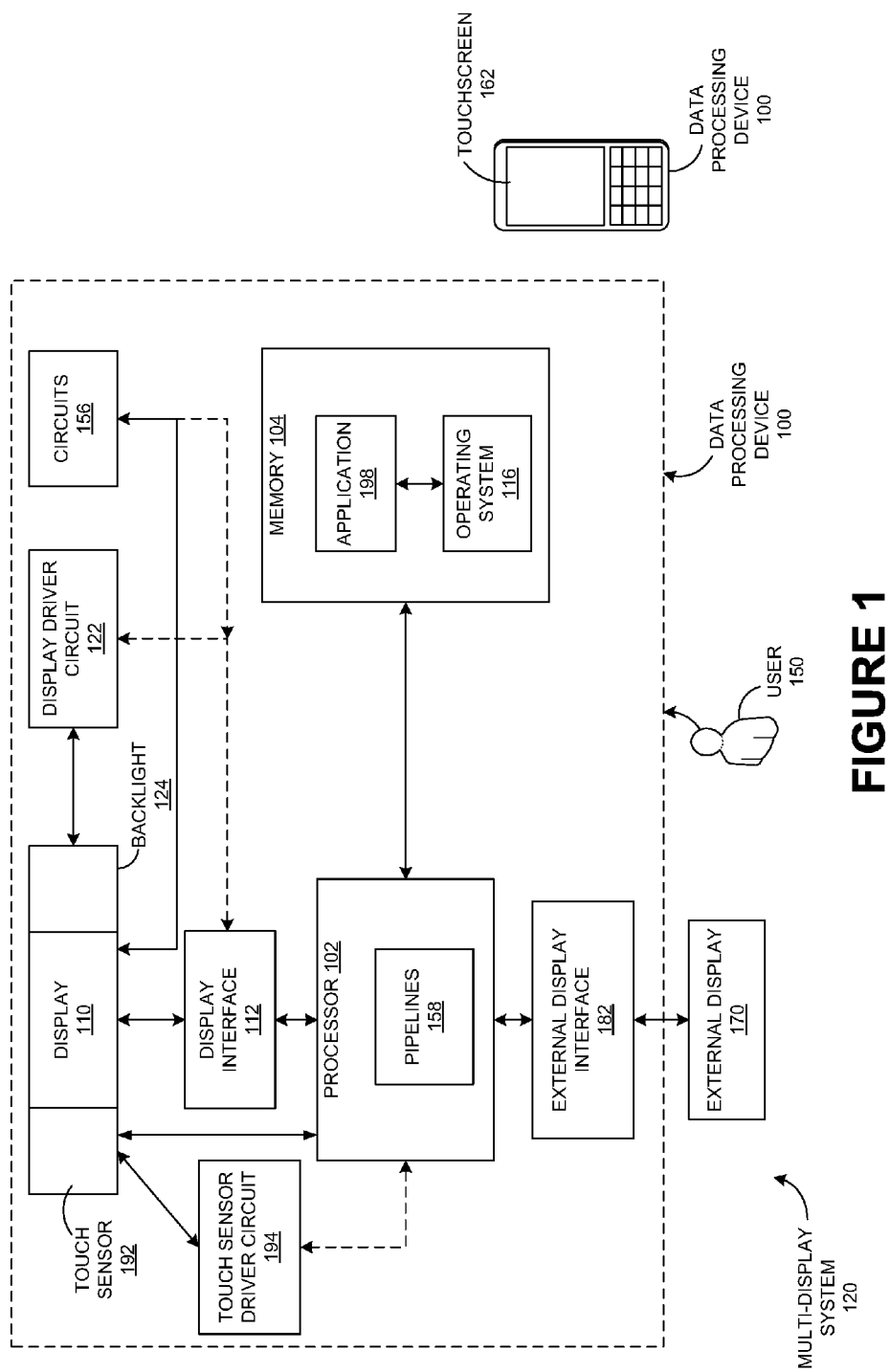
FIG. 1 is a schematic view of a multi-display system, according to one or more embodiments.

FIG. 1 shows a multi-display system 120, according to one or more embodiments. In one or more embodiments, multi-display system 120 may include a data processing device 100 (e.g., a desktop computer, a laptop computer, a notebook, a netbook, a mobile device such as a mobile phone) capable of being communicatively coupled to an external display 170 (e.g., a Liquid Crystal Display (LCD), a Cathode Ray Tube (CRT) monitor) through an external display interface 182 (e.g., a display port) thereof. In one or more embodiments, data processing device 100 may include a processor 102 (e.g., Central Processing Unit (CPU), Graphics Processing Unit (GPU)) communicatively coupled to a memory 104 (e.g., volatile memory and/or non-volatile memory); processor 102 may be configured to address storage locations in memory 104. In one or more embodiments, processor 102 may also be interfaced with external display interface 182.

In one or more embodiments, data processing device 100 may also include a display 110 thereof communicatively coupled to processor 102 by way of a display interface 112. It is obvious that external display 170 is external to data processing device 100 and display 110 is part of data processing device 100. In one or more embodiments, data processing device 100 may execute an operating system 116 thereon; instructions associated with operating system 116 are shown as being part of memory 104. In one or more embodiments, display 110 may include a display driver circuit 122 that is configured to modify power levels of a backlight 124 thereto based on a control signal from processor 102. It should be noted that processor 102 may be a single processor or a set of processors and/or controllers configured to execute instructions to provide functionalities associated with data processing device 100.

In one or more embodiments, when external display 170 is coupled to data processing device 100, data on display 110 may be cloned on external display 170. For example, external display 170 may initiate a communicate process with data processing device 100 at a level of operating system 116 by transmitting an appropriate message. Data processing device 100 may then acknowledge receipt of the message and processor 102 may obtain information related to the display attributes (e.g., display resolution) of external display 170. If the display attributes are deemed by processor 102 to be compatible with those supported by operating system 116, then processor 102 (e.g., a GPU) may transmit display data associated with the "screen" of display 110 to be rendered on external display 170 (e.g., following GPU scanout). Other forms of communication for cloning of display data across external display 170 are within the scope of the exemplary embodiments discussed herein.

It is obvious that external display 170 may be coupled to data processing device 100 through wired or wireless (e.g., through Wi-Fi™, Bluetooth®) means. FIG. 1 shows a user 150 of data processing device 100. During the cloning discussed above, user 150 may not be able to choose to set the "screen" on external display 170 alone. Thus, the "screen" of display 110 may consume power despite not serving the primary purpose thereof. Display 110 may merely be used as an input device.

In data processing device 100 executing a Windows® operating system (example operating system 116), user 150 may possess a capability to set external display 170 as the sole display device. FIG. 1 shows display 110 as having a touchscreen 162 providing touch-sensitive capabilities thereto. The touch-sensitive capability may be provided through a touch sensor 192 associated with display 110, touch sensor 192 being interfaced with processor 102 through an appropriate interface (not shown). Touch sensor 192 may have a touch sensor driver circuit 194 associated therewith that is configured to be controlled based on a control signal from processor 102. When external display 170 is set as the sole display device, display 110 may be completely turned off along with touch sense thereof. Therefore, in order to interact with data processing device 100, user 150 may have to connect with an external input device (not shown) such as a mouse or a keyboard/keypad; the external input device may have to be coupled to processor 102 by way of a user interface (not shown).

Figure 2:
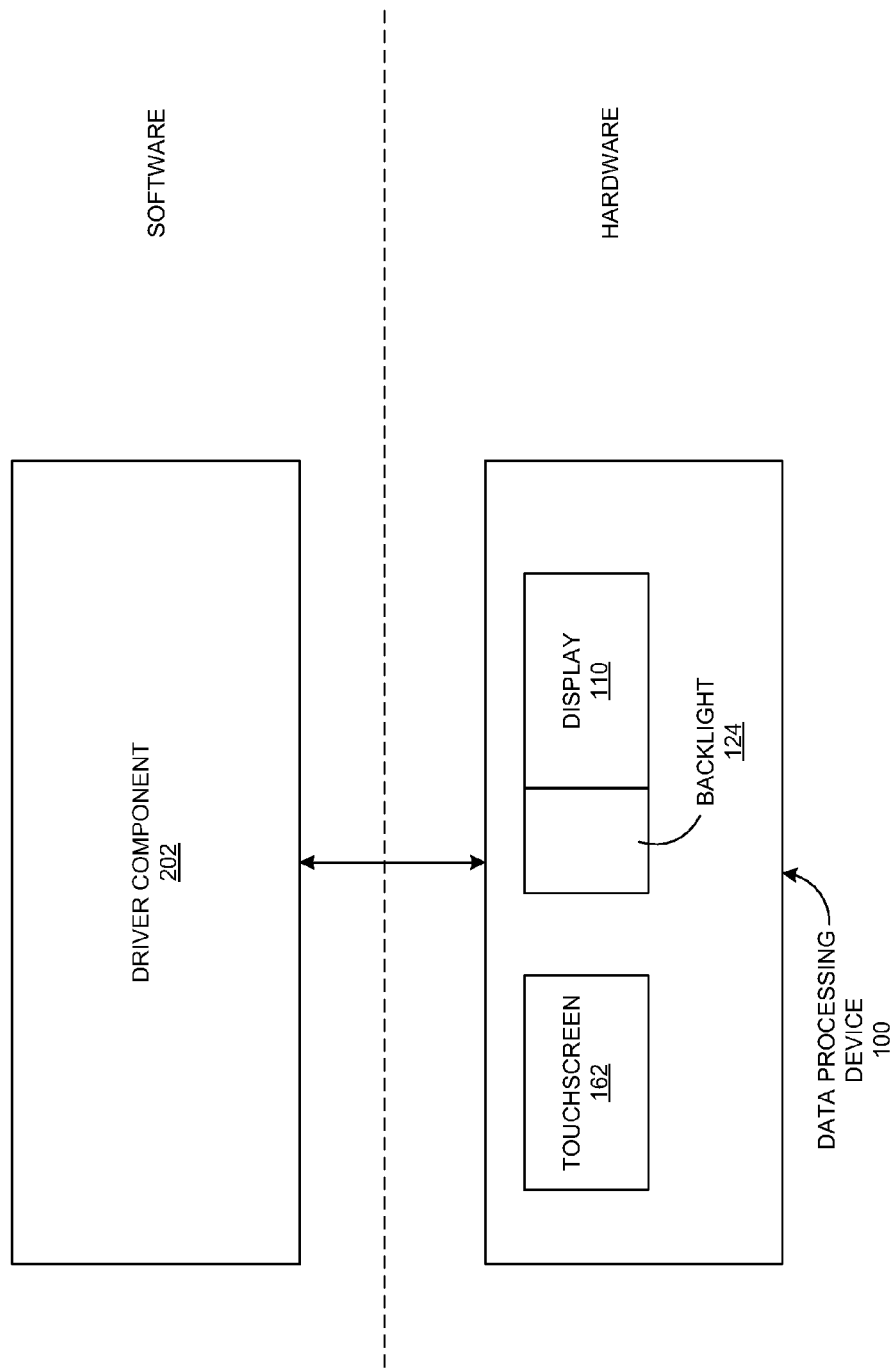
FIG. 2 is a schematic view of a data processing device with a capability to retain a touch-sense capability of a display thereof in a power saving mode of being coupled to an external display, according to one or more embodiments.

FIG. 2 shows data processing device 100 with a capability to retain the touch-sense capability of display 110 in a power saving mode of being coupled to external display 170, according to one or more embodiments. In one or more embodiments, a driver component 202 (e.g., a set of instructions) associated with display 110 and/or touchscreen 162 may be provided in data processing device 100. In one or more embodiments, the aforementioned driver component 202 may be configured to enable turning off of display 110 and retention of touchscreen capability of data processing device 100 when external display 170 is coupled to data processing device 100. The turning off of display 110 may include turning off of backlight 124, power gating of circuits (e.g., circuits 156) and/or processing pipelines (e.g., pipelines 158 of processor 102) associated with functionalities of display 110, for example, rendering of the display data thereon.

Figure 3:
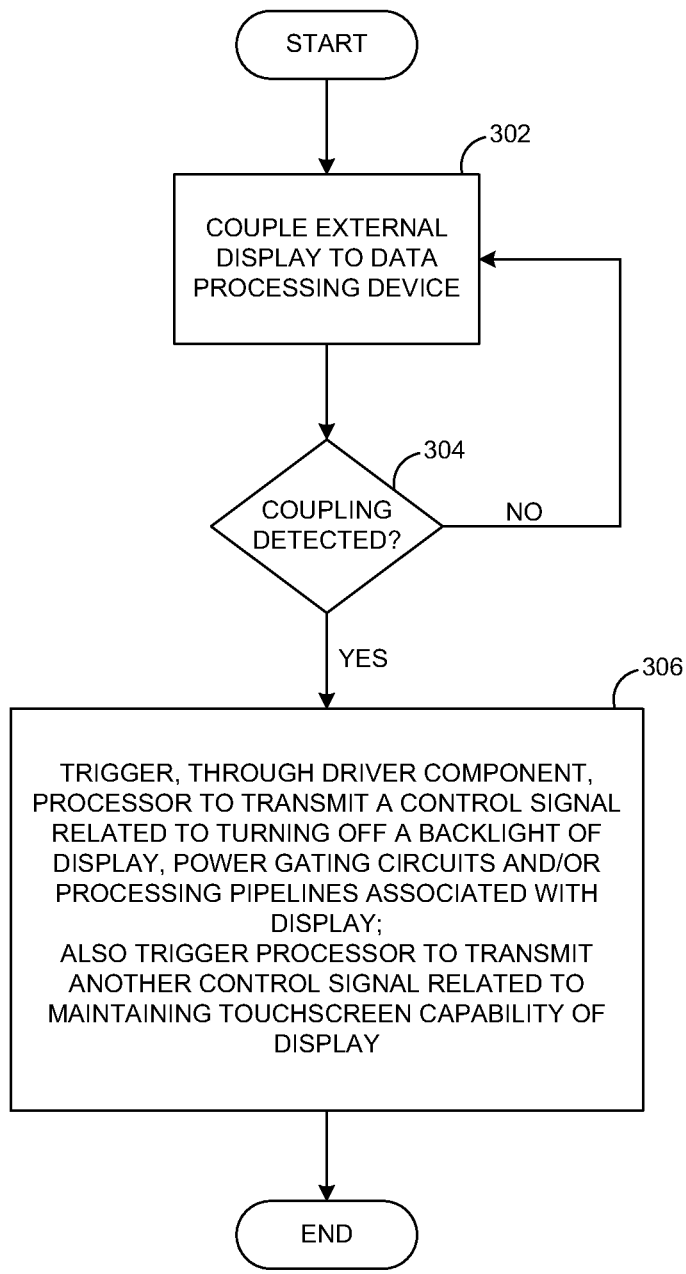
FIG. 3 is a flowchart detailing the operations involved in the retention of the touch-sense capability of the display of the data processing device of FIGS. 1-2, according to one or more embodiments.

FIG. 3 shows a flowchart detailing the operations involved in the process discussed above. In one or more embodiments, operation 302 may involve user 150 coupling external display 170 to data processing device 100. In one or more embodiments, operation 304 may involve detecting, through processor 102, coupling of external display 170 to data processing device 100 through external interface 182. It is obvious that processor 102 may poll external interface 182 for external display 170 periodically; alternately, the coupling of external display 170 may trigger transmission of an event to processor 102. All forms of detection of coupling of external display 170 are within the scope of the exemplary embodiments discussed herein.

In one or more embodiments, if processor 102 does not detect coupling of external display 170, external display 170 may be reconnected. In one or more embodiments, if the result of operation 304 results in detection of coupling of external display 170, operation 306 may involve driver component 202 triggering processor 102 to transmit a control signal related to turning OFF backlight 124 of display 110 and/or power gating circuits and/or processing pipelines associated with display 110. In one or more embodiments, driver component 202 may also trigger processor 102 to transmit another control signal related to maintaining touchscreen capability of display 110. In one or more embodiments, this may involve transmitting the another control signal to maintain a current active state of touch sensor 192.

In one or more embodiments, user 150 may, therefore, utilize the "screen" of display 110 of data processing device 100 to perform functionalities associated therewith while leveraging enhanced capabilities of external display 170; for example, external display 170 may be larger than display 110 or external display 170 may support higher resolution images/video frames than display 110. It is obvious that the movement of a finger of user 150 on touchscreen 162 may correspond to movement across the "screen" of external display 170.

In one or more embodiments, driver component 202 associated with display 110 and/or touchscreen 162 discussed above may be a driver of processor 102 or may be packaged with operating system 116. Alternately, driver component 202 may be packaged with an application 198 (shown in FIG. 1) executing on data processing device 100. Here, application 198 may provide an interface for user 150 to enable/disable the abovementioned processes. Instructions associated with driver component 202 may also be embodied on a non-transitory medium (e.g., Compact Disc (CD), Digital Video Disc (DVD), Blu-ray Disc®, hard drive; appropriate files may be downloaded to the hard drive) readable through data processing device 100. All reasonable variations are within the scope of the exemplary embodiments discussed herein.

In one or more embodiments, as backlight 124 may be a power-consuming component of data processing device 100, switching-off thereof results in power savings associated with data processing device 100 when compared to data processing device 100 having backlights of both display 110 and external display 170 turned on. Further, processing pipelines associated with rendering display data on display 110 may be power gated, along with appropriate circuitry (e.g., circuits 156) therefor. Power consumption, therefore, may further be reduced in data processing device 100.

Figure 4:
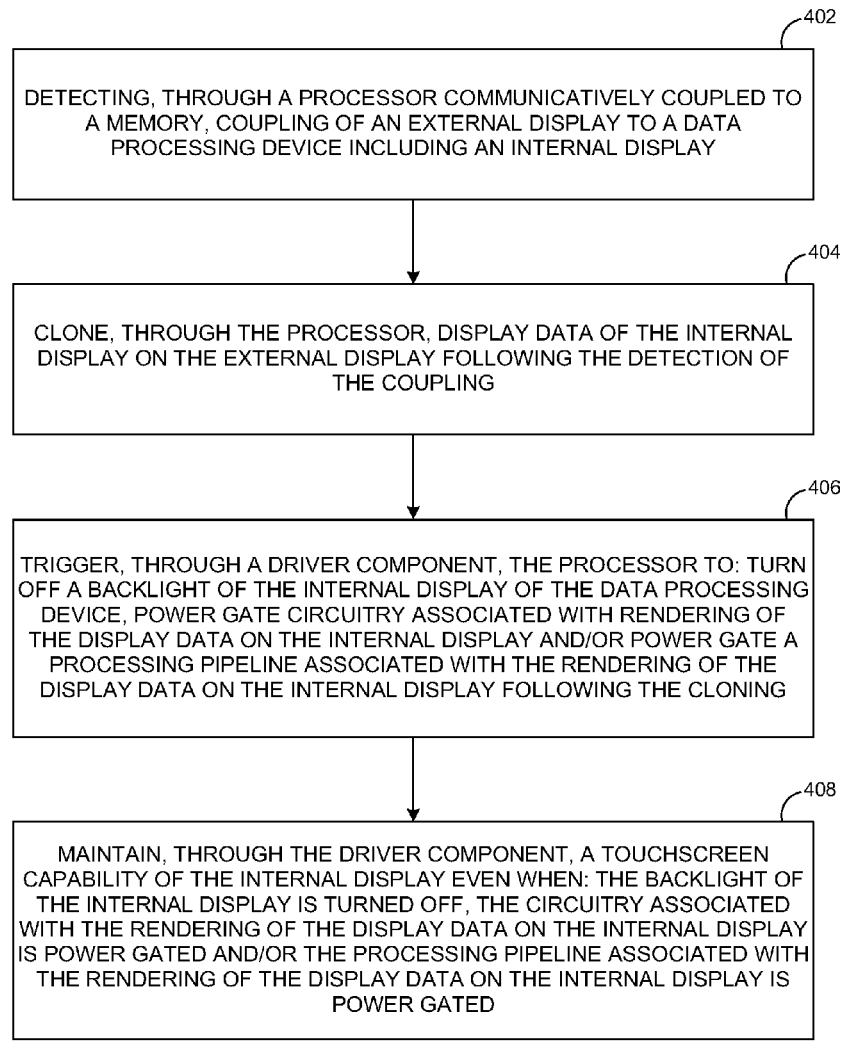
FIG. 4 is a process flow diagram detailing the operations involved in power gating the display of the data processing device of FIGS. 1-2 during cloning thereof across the external display, according to one or more embodiments.

FIG. 4 shows a process flow diagram detailing the operations involved in power gating display 110 of data processing device during cloning thereof across external display 170 while retaining touch-sensibility thereof, according to one or more embodiments. In one or more embodiments, operation 402 may involve detecting, through processor 102 communicatively coupled to memory 104, coupling of external display 170 to data processing device 100 including an internal display (e.g., display 110). In one or more embodiments, operation 404 may involve cloning, through processor 102, display data of display 110 on external display 170 following the detection of the coupling. In one or more embodiments, operation 406 may involve triggering, through driver component 202, processor 102 to: turn off backlight 124 of display 110 of data processing device 100, power gate circuits 156 associated with rendering the display data on display 110 and/or power gate processing pipelines 158 associated with the rendering of the display data on display 110 following the cloning.

In one or more embodiments, operation 408 may then involve maintaining, through driver component 202, a touchscreen capability of display 110 even when: backlight 124 of display 110 is turned off, circuits 156 associated with the rendering of the display data on display 110 are power gated and/or processing pipelines 158 associated with the rendering of the display data on display 110 are power gated.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., data processing device 100). Accordingly, the specification and drawings are to be regarded in an illustrative rather than a restrictive sense.

What is claimed is:

1. A method comprising:
    detecting, through a processor communicatively coupled to a memory, coupling of an external display to a data processing device including an internal display that includes a display driver circuit configured to modify power levels of a backlight based on a control signal transmitted from the processor to the display driver circuit;
    cloning, through the processor, display data of the internal display on the external display following the detection of the coupling;
    triggering, through a software driver component, the processor to turn off the backlight by transmitting a signal to the display driver circuit following the cloning; and
    maintaining, through the software driver component, a touchscreen capability of the data processing device even when the backlight of the internal display is turned off,
    wherein the touchscreen capability is provided through a touch sensor associated with the internal display, and
    wherein the touchscreen capability is maintained based on a control signal. transmitted from the processor to a touch sensor driver circuit associated with the touch sensor.

2. The method of claim 1, wherein the software driver component is associated with the internal display.

3. The method of claim 1, further comprising providing the software driver component through packaging the driver component with an operating system executing on the data processing device.

4. The method of claim 1, wherein cloning the display data of the internal display on the external display further comprises:
    initiating a communication between the internal display and the external display at a level of an operating system executing on the data processing device;
    obtaining information related to at least one display attribute of the external display through the processor;
    determining compatibility of the at least one display attribute with the operating system through the processor; and
    transmitting, through the processor, the display data of the internal display to the external display to be rendered thereon following the determination of the compatibility.

5. The method of claim 1, comprising one of: wirelessly coupling the external display to the data processing device and coupling the external display to the data processing device through wired means.

6. A data processing device comprising:
    a memory including an operating system and a software driver component associated with the operating system;

an internal display that includes a display driver circuit configured to modify power levels of a backlight based on a control signal transmitted from the processor to the display driver circuit a processor communicatively coupled to the memory, the processor being configured to execute instructions to:
  detect coupling of an external display to the data processing device, and
  clone display data of the internal display on the external display following the detection of the coupling; and a touch sensor associated with a touch sensor driver circuit configured to control a touchscreen capability of the data processing device based on a control signal transmitted from the processor to the touch sensor driver circuit, wherein the software driver component, when executed by the processor, is configured:
  trigger the processor to turn off a backlight of the internal display of the data processing device following the cloning, and
  maintain the touchscreen capability of the data processing device even. when the backlight of the internal display is turned off.

7. The data processing device of claim 6, wherein the software driver component is associated with the internal display.

8. The data processing device of claim 6, wherein the software driver component is provided through packaging the driver component with the operating system executing on the data processing device.

9. The data processing device of claim 6, wherein the processor is configured to execute instructions to clone the display data of the internal display on the external display based on:
  initiating a communication between the internal display and the external display at a level of an operating system executing on the data processing device,
  obtaining information related to at least one display attribute of the external display,
  determining compatibility of the at least one display attribute with the operating system, and
  transmitting the display data of the internal display to the external display to be rendered thereon following the determination of the compatibility.

10. The data processing device of claim 6, wherein one of: the external display is wirelessly coupled to the data processing device and the external display is coupled to the data processing device through wired means.

11. A non-transitory medium, readable through a data processing device and including instructions embodied therein that are executable through the data processing device, comprising:

instructions to detect, through a processor communicatively coupled to a memory, coupling of an external display to the data processing device including an internal display that includes a display driver circuit configured to modify power levels of a backlight based on a control signal transmitted from the processor to the display driver circuit;

instructions to clone, through the processor, display data of the internal display on the external display following the detection of the coupling;

instructions to trigger, through a software driver component, the processor to turn off the backlight by transmitting a signal to the display driver circuit following the cloning; and instructions to maintain, through the software driver component, a touchscreen capability of the data processing device even when the backlight of the internal display is turned off, wherein the touchscreen capability is provided through a touch sensor associated with the internal display, and wherein the touchscreen capability is maintained based on a control signal transmitted from the processor to a touch sensor driver circuit associated with the touch sensor.

12. The non-transitory medium of claim 11, comprising instructions compatible with the software driver component being associated with the internal display.

13. The non-transitory medium of claim 11, wherein instructions to clone the display data of the internal display on the external display further comprises:
  instructions to initiate a communication between the internal display and the external display at a level of an operating system executing on the data processing device;
  instructions to obtain information related to at least one display attribute of the external display through the processor;
  instructions to determine compatibility of the at least one display attribute with the operating system through the processor; and
  instructions to transmit, through the processor, the display data of the internal display to the external display to be rendered thereon following the determination of the compatibility.

14. The non-transitory medium of claim 11, comprising instructions compatible with one of: the external display being wirelessly coupled to the data processing device and the external display being coupled to the data processing device through wired means.

* * * * *